April 20, 1948.  M. J. BROWN  2,439,920
AUTOMATIC AND MANUAL CONTROL SYSTEM FOR CIRCUIT BREAKERS
Filed Dec. 15, 1943
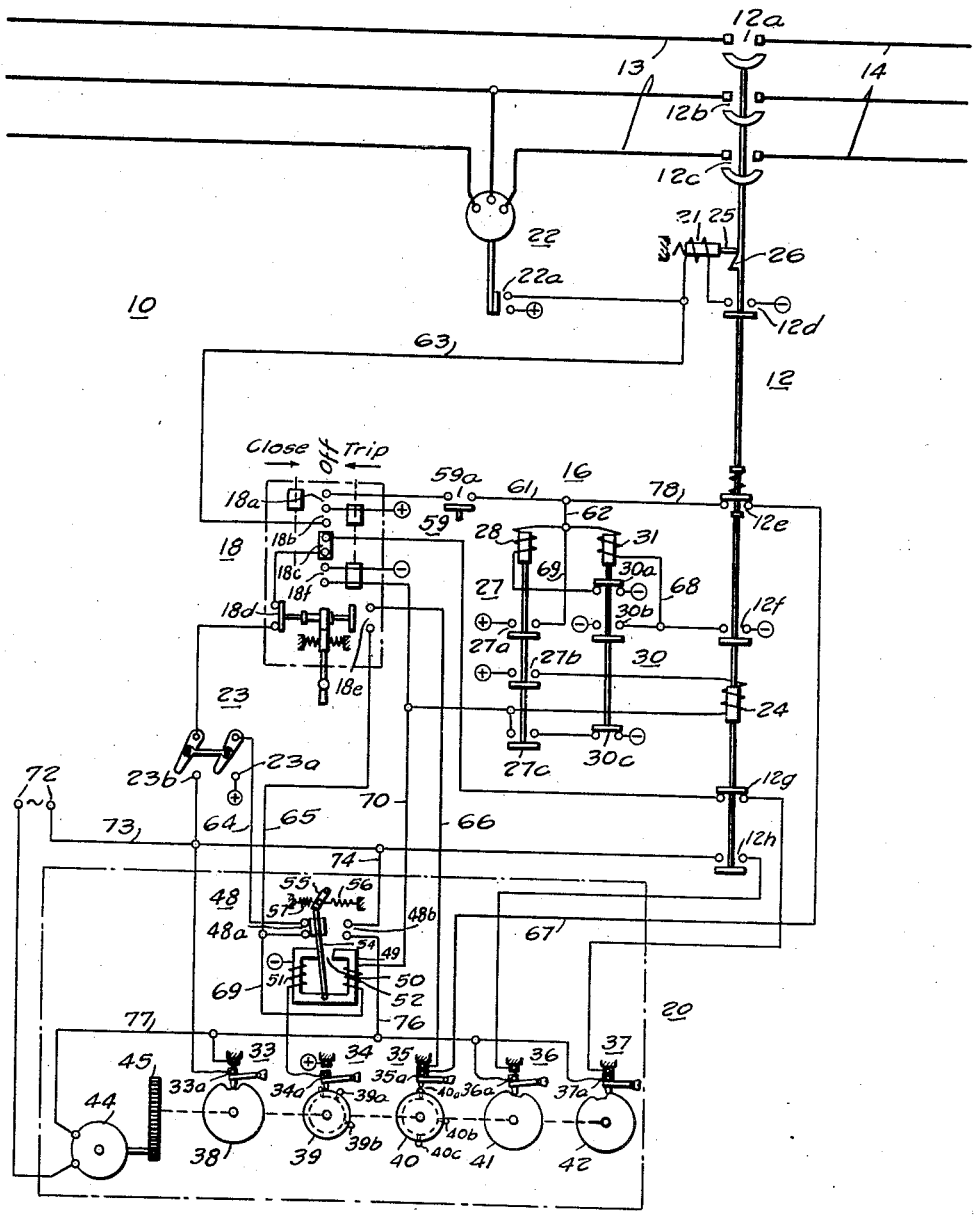
WITNESSES:
E. A. M<sup>c</sup>Closkey
F. V. Giolma
INVENTOR
Myron J. Brown.
BY
G. M. Crawford
ATTORNEY Patented Apr. 20, 1948

2,439,920

UNITED STATES PATENT OFFICE 2,439,920

AUTOMATIC AND MANUAL CONTROL SYSTEM FOR CIRCUIT BREAKERS

Myron J. Brown, Forest Hills, Pa., assignor to Westinghouse Electric Corporation, East Pittsburgh, Pa., a corporation of Pennsylvania Application December 15, 1943, Serial No. 514,373

13 Claims. (Cl. 175—294)

My invention relates, generally, to control systems and has reference, in particular, to automatic reclosing systems for circuit breakers.

Generally stated, it is an object of my invention to provide, in a simple and inexpensive manner, for improving the operation of automatic reclosing systems for circuit breakers.

More specifically, it is an object of my invention to provide for decreasing the time required for effecting the initial reclosure of a circuit breaker, which is adapted to be reclosed a predetermined number of times after opening due to a fault condition, in an effort to effect continued operation of the system.

An important object of my invention is to provide for preparing an initial reclosing circuit for a circuit breaker which is disposed to be reclosed a predetermined number of times before the circuit breaker reaches the fully open position.

Another object of my invention is to provide for using a relay having means for mechanically retaining the armature in one operating position until said means is overcome, as an anti-pump relay in an automatic reclosing system, in conjunction with a timing device which determines a predetermined number of reclosures, so that when the circuit breaker is closed a reclosing circuit is set up instantaneously through normally closed contact members of the relay.

A further object of my invention is to provide for presetting an initial reclosing circuit for a circuit breaker, which is arranged for a plurality of timed reclosures subsequent to opening in response to a fault condition.

Yet another object of my invention is to provide for simplifying the usual automatic circuit breaker reclosing system and reducing the time required for the initial reclosure of the sequence after the circuit breaker has opened in response to a fault condition.

Still another object of my invention is to provide a flexible automatic reclosing system for a circuit breaker which may be readily adjusted to provide instantaneous or delayed initial reclosure after the circuit breaker opens in response to a fault condition.

It is also an important object of my invention to provide for using a synchronizing switch in a manually operated closing circuit for a circuit breaker having an automatic reclosing system and to prevent operation of the automatic reclosing system when manually reclosing the circuit breaker through the synchronizing switch.

Other objects will, in part, be obvious and will, in part, be described hereinafter.

In accordance with the principles of my invention, a circuit breaker reclosing system may be provided with a cam operated switch for controlling the operation of the circuit breaker to provide a predetermined number of spaced reclosures subsequent to opening of the circuit breaker in response to a fault condition. Pumping of the circuit breaker under continued fault conditions is prevented by providing an anti-pumping relay of the toggle type which remains in the position to which it was last operated. Normally closed contact members of the relay provide an instantaneous reclosing circuit for the circuit breaker in conjunction with contact members of the cam operated switch and auxiliary contact members of the circuit breaker. Delayed reclosure of the circuit breaker may be secured by changing the adjustment of the cam operated contact members of the timing switch. Manual synchronization is effected by rendering the automatic reclosing means inoperative each time the circuit breaker is tripped, and then closing the circuit breaker through a synchronizing switch.

For a more complete understanding of the nature and scope of my invention, reference may be made to the following detailed description which may be studied in connection with the accompanying drawing, in which the single figure is a diagrammatic view of an automatic circuit breaker reclosing system embodying the principal features of the invention.

Referring to the single figure of the drawing, the reference numeral 10 may denote, generally, an automatic circuit breaker reclosing system for controlling the operation of a circuit breaker 12 which may be provided for connecting conductors 13 and 14 in a power system. Control means 16 of the usual type may be provided for effecting closure of the circuit breaker 12 either under the control of a manual control switch 18 or automatic reclosing means 20. The circuit breaker 12 may be tripped by means of a suitable trip device 21, either under the control of the manual switch 18 or of a protective device denoted, generally, by the numeral 22. Switch means 23 may be provided for rendering the reclosing means 20 ineffective.

The circuit breaker 12 may be of any suitable type comprising, for example, main contact members 12a—b—c operated by an armature which may be provided with an operating winding 24. The circuit breaker may be retained in a closed position by suitable latch means 25 which may be actuated by the trip means 21 to release a latch member 26 and open the circuit breaker.

The circuit breaker control means 16 may also be of a well-known type comprising, for example, a circuit breaker control or closing switch 27 having an operating winding 28 which is disposed to be connected to a suitable source of control power by either the manual control switch 18 or the reclosing means 20, and disconnected from the source by means of a cutoff relay 30 having an operating winding 31. For the purposes of convenience, the usual control buses for energizing the control relays and switches in the system have been omitted, and the connections thereof to the different conductors are indicated by means of + and − signs.

In order to provide for maintaining the connection between the conductors 13 and 14, automatic reclosure of the circuit breaker is provided for by means of the reclosing means denoted, generally, by the numeral 20. The reclosing means may, for example, comprise a plurality of switches 33 through 37 disposed to be operated by cams 38 through 42 driven by means of a suitable motor 44 and a gear train 45. A predetermined number of reclosures of the circuit breaker 12 may be effected at timed intervals by providing the cam 40 with a predetermined number of adjustably positioned cam members 40a—b—c, which may be disposed to actuate the switch 35 and provide an energizing circuit for the circuit breaker closing switch 27 in conjunction with an auxiliary contact member 12e of the circuit breaker and a contact member 48a of a control relay 48 which in this instance replaces the usual X and Y control relays of the usual reclosing means.

In order to provide for instantaneous reclosure of the circuit breaker subsequent to opening in response to a fault condition, the contact member 48a of the relay 48 may be normally closed, thus providing in advance or presetting a reclosing circuit for the circuit breaker which is completed the instant the auxiliary contacts 12e of the circuit breaker close, which instant may be so timed that it occurs while the circuit breaker is still opening. The control relay 48 may be of a type which has an armature which is mechanically retained in the position to which it is operated. It may, for example, be of the toggle type comprising a substantially C-shaped core 49 having an air gap 50 in one side thereof. Operating windings 51 and 52 may be provided on the opposite legs of the core member for actuating an armature 54 which may be pivotally mounted adjacent the lower end and positioned in the air gap 50, to either of two operating positions. A toggle action may be imparted to the armature 54, for mechanically retaining it in either of the operating positions until the other operating winding is energized, by means of a pivoted toggle member 55 which may engage the upper end of the armature 54 and be provided with centering springs 56 and 57.

With the circuit breaker 12 in the deenergized position, as shown, closure thereof may be effected manually by operating the manual control switch 18 to the closed position whereupon energizing circuit for the operating winding 28 of the circuit breaker closing switch 27 is provided from the positive terminal through the "closed" contact member 18a of the manual switch, contact members 59a of synchronizing switch 59 which may be used in conjunction with a synchroscope (not shown) for preventing closure of the circuit breaker 12 except when the conductors 13 and 14 are synchronized, conductor 61, conductor 62, operating winding 28 of the circuit breaker switch 27, and normally closed contact members 30a of the cutoff relay 30 to the negative terminal. The circuit breaker switch 27 closes, completing a holding circuit for the operating winding 28 through its normally open contact members 27a, the operating winding 28, and the normally closed contact members 30a of the cutoff relay 30. Closure of the normally open contact members 27b provides an energizing circuit for the operating winding 24 of the circuit breaker solenoid from the positive terminal through contact members 27b, the operating winding 24, contact members 27c, and the normally closed contact members 30c of the cutoff relay 30. The control relay 48 is operated by an energizing circuit provided through contact members 27c and starts the timing motor which runs through its sequence and resets the relay.

The operating winding 31 of the cutoff relay 30 is energized through the auxiliary contact members 12f of the circuit breaker 12, and contact members 27a of the circuit breaker closing switch 27. Operation of the cutoff relay 30 opens contact members 30a to deenergize the operating winding 28 of the circuit breaker closing switch 27, and opens contact members 30c so as to interrupt the energizing circuit for the operating winding 24 of the circuit breaker solenoid. Contact members 30b close, providing a holding circuit for the operating winding 31. The latch means 25 retains the circuit breaker in the closed position.

The circuit breaker may be tripped manually by operating the control switch 18 to the "trip" position, whereupon an energizing circuit for the operating winding of the trip means 21 is provided from the positive terminal through the "trip" contact members 18b, conductor 63, trip means 25 and contact members 12d to the positive terminal. Reclosure of the circuit breaker by the reclosing means 20 is prevented by the slip contact member 18e of the manual control switch, which opens when the circuit breaker is tripped manually, and remains open until the circuit breaker is closed by operating the manual control switch to the "close" position.

With the circuit breaker closed, the contact members 22a of the protective relay 22 close upon the occurrence of a fault condition, and complete an energizing circuit for the operating winding of the trip means 21. This actuates the movable latch member 25 to free the latch member 26 of the circuit breaker mechanism so that it may return by gravity to the open position. Prior to the circuit breaker reaching the fully open position, the contact members 12e which may be adjusted for different times of closure relative to the operating position of the circuit breaker mechanism closes completing a reclosing circuit for the control switch 27 of the circuit breaker, extending from the positive terminal through contact members 23a of the automatic cutout switch 23, conductor 64, contact members 48a of the anti-pumping relay 48, conductor 65, slip contact member 18e of the manual control switch 18, conductor 66, timing switch contact member 35a which is initially held in a closed position by the cam member 40a, conductor 67, auxiliary contact members 12e of the circuit breaker 12, conductor 62, operating winding 28 of the circuit breaker control switch 27, and normally closed contact members 30a of the cutoff relay 30 to the negative bus. The circuit breaker control switch 27 operates, completing the energizing circuit for the operating winding 24 of the circuit breaker solenoid through normally open contact members 27b and 27c.

The circuit breaker 12 closes and is latched by the latch means 25 if the contact members 22a of the protective relay 22 have opened in response to the removal of the fault condition which caused the initial tripping of the circuit breaker. Closure of the circuit breaker 12 completes an energizing circuit for the operating winding 31 of the cutoff relay 30 from the negative terminal through the auxiliary contact members 12f of the circuit breaker, conductor 68, operating winding 31, conductor 69 and the contact members 27a of the circuit breaker control switch 27. The cutoff relay 30 operates, deenergizing the operating winding 24 of the circuit breaker 12 and the operating winding 28 of the circuit breaker control switch 27. At the same time, the cutoff relay 30 provides a holding circuit for its own operating winding through contact members 30b.

Upon the closure of the circuit breaker control switch 27, the operating winding 52 of the anti-pumping relay 48 is energized from the positive bus through contact members 23a of the automatic reclosing cutout switch 23, normally closed contact members 48a, conductor 69, operating winding 52, and conductor 70 through the contact members 27c of the control switch and the normally closed contact members 30c of the cutoff relay to the negative terminal. The armature 54 of the anti-pumping relay is thereupon actuated to the opposite operating position opening contact members 48a and closing contact members 48b. This prevents subsequent reclosures of the circuit breaker during the period in which the cam member 40a still maintains the contact member 35 in the closed position in the event that the first reclosure is not successful. Since this cam member normally maintains the contact member 35a in a closed position for approximately 10° of its rotation, the anti-pumping relay 48 performs an important function in thus interrupting the energizing circuit for the operating winding 28 of the circuit breaker control switch 27.

As soon as the anti-pumping relay 48 operates, an energizing circuit is provided for the timing motor 44, extending from the alternating current source 72 through conductors 73 and 74, contact members 48b of the anti-pumping relay, and conductors 76 and 77 to the motor 44, and thence back to the source. After the timing motor has operated for a predetermined interval, the operating winding 51 of the anti-pumping relay is energized by closure of the contact member 34a, which may be operated by the cam member 39a after the cam 39 has operated through approximately 12°.

The anti-pumping relay 48 returns to the original operating position and the motor 44 continues to operate through one or another of the energizing circuits provided by means of the contact members 33a, 36a or 37a which are closed by the cams 38, 41 and 42, respectively, throughout their operation from about 0°–345°, 10°–360° and 0°–354°, respectively from the initial operating position.

If the circuit breaker remains closed, the timing motor 44 continues to operate through a complete sequence which is finally determined by the opening of the contact members 36a by the cam member 41 after it has traveled through 360°. Under these conditions, the circuit breaker and reclosing means are reset for a subsequent reclosure should the circuit breaker open subsequently, due to a fault condition.

If the circuit breaker 12 does not remain closed upon the first reclosure, a subsequent reclosure during the initial reclosing period, which may, for example, be from zero to about 10° as determined by the cam member 40a, is prevented, since the normally closed contact members of the anti-pumping relay 48 opened immediately upon the initial closure of the circuit breaker control switch 27. This interrupts the operating circuit of the circuit breaker control switch 27. Accordingly, the timing motor 44 continues to operate by means of the circuits through contact members 33a or 37a and the antipump relay 48 is returned to the reset position by the closure of the contact member 34 by means of the cam member 39a on the timing cam 39. This interval may occur shortly after the contact member 35 opens, since the operating circuit for the control relay will then be already open.

As soon as the second reclosing interval is initiated by the reclosure of the contact members 35a of the reclosing means by cam member 40b, which may, for example, be from about 90°–100°, a reclosing circuit for the circuit breaker control switch 27 is again provided, extending from the positive bus through contact members 23a of the automatic reclosing cutout switch 23, conductor 64, normally closed contact members 48a of the anti-pumping relay, conductor 65, slip contact members 18e of the manual control switch, conductor 66, contact members 35a, conductor 67, auxiliary contact member 12e of the circuit breaker, conductor 78, conductor 62, operating winding 28, and normally closed contact member 30a of the cutoff relay 30 to the negative terminal. Again the circuit breaker control switch 27 operates, completing an energizing circuit for the operating winding 24 of the circuit breaker closing solenoid through contact members 27b, and providing a holding circuit for its operating winding through contact members 27a.

An energizing circuit for the operating winding 52 of the anti-pumping relay 48 is provided at the same time through the contact members 27c of the circuit breaker control switch. The circuit breaker 12 again recloses, and the anti-pumping relay 48 operates, opening normally closed contact members 48a so as to prevent subsequent reclosures of the circuit breaker during this timing interval, should the circuit breaker fail to stay closed. The timing motor is energized through contact members 48b of the control relay 48.

If the circuit breaker remains closed, the timing motor 44 continues to run through the circuit provided by the contact member 36a from about 10° to 360°, to the reset position. The anti-pumping relay 48 is reset through the closure of contact members 34a by the cam member 39b during the interval of from 102°–112°.

Should the circuit breaker fail to stay closed, a third and final reclosure is provided when the contact member 35a is again closed by the cam member 40c, during the interval between about 180°–190°, whereupon the reclosing sequence takes place substantially the same as hereinbefore described in connection with the first and second reclosures. Should the circuit breaker fail to remain closed after the third reclosure, it is locked open, since the timing motor 44 stops when the operating circuit therefor is interrupted after about 354° of travel of the cam 42. No further reclosures may be made until the system has been reset by manually reclosing the breaker through operation of the control switch 18 after removal of the fault condition, whereupon the timing motor resets the reclosing system.

In the event that instantaneous reclosure of the circuit breaker is not desired, the cam member 48a may be positioned so as to initially close contact members 35 at other than the zero point in the operating sequence, whereupon operation of the timing motor 44 may be initiated through an auxiliary circuit including contact members 37a which are operated by the cam member 42. This circuit may be traced from one terminal of the alternating current source through contact member 23b of the automatic reclosing cutoff switch 23, slip contact member 18d of the control switch, the off contact member 18c, a normally closed auxiliary contact member 12g of the circuit breaker, contact member 37a, and conductor 11, to the motor 44 and the other side of the alternating current source.

In order to prevent automatic reclosure of the circuit breaker when attempting to synchronize the conductors 13 and 14 while manually reclosing the breaker by operating the manual control switch 18, auxiliary trip contacts 18f may be provided on the control switch for effecting energization of the operating winding 52 of the control relay 48 whenever the circuit breaker is tripped manually. This sets up an energizing circuit for the timing motor 44 and since the breaker is open the motor runs to the lockout position as determined by switch 37. Accordingly the reclosing means 20 cannot operate until the breaker has first been reclosed, through the synchronizing switch 59, whereupon the timing motor resets through switch 36 and the auxiliary contact members 12h of the circuit breaker. The system is then ready for reclosure upon subsequent opening in response to a fault condition.

From the above description and accompanying drawing, it will be apparent that I have provided, in a simple and effective manner, for effecting instantaneous reclosure of a circuit breaker in an automatic reclosing system which also provides for predetermined reclosures of the circuit breaker in an effort to maintain it in the closed position. By using an anti-pumping relay which remains in the position to which it was last operated until some additional operation is performed, such as, for example, a relay of the toggle type, wherein the contacts remain in a position to which they were last operated until a subsequent operation of the relay is effected, a reclosing circuit for the circuit breaker may be preset in abeyance of the opening of the breaker, so that valuable time usually lost in closing relays, contacts, etc., is saved. With the present high speed reclosing systems, the gain of such time in the initial reclosure becomes important in maintaining continuity of service. The reclosing system provided by my invention is flexible and may be adjusted for other than instantaneous reclosure, if desired.

Since certain changes may be made in the above description, and different embodiments of the invention may be made without departing from the spirit or scope thereof, it is maintained that all the matter contained in the above description and shown in the accompanying drawing shall be considered as illustrative and not of any limiting sense.

I claim as my invention:

1. A reclosing system for a circuit breaker having an operating winding comprising, relay means operable to effect energization of the circuit breaker operating winding, sequence timing means operable a predetermined number of times to provide an energizing circuit for the relay means, control means controlled by the relay means and the sequence timing means for preventing successive energizations of the relay means during any one operation of the sequence timing means, and circuit means including contact members of said control means and the sequence timing means closed when the circuit breaker is closed connected to provide an energizing circuit for the relay means which is completed by the circuit breaker upon opening.

2. An automatic reclosing system for a circuit breaker having auxiliary contact members open when the circuit breaker is closed and actuated to the closed position upon the opening of the circuit breaker comprising, sequence timing means including normally closed contact members operable to determine a predetermined number of reclosures of the circuit breaker subsequent to an opening on a fault condition, control means having normally closed contact members cooperative with the normally closed contact members of the sequence timing means and the auxiliary contact members of the circuit breaker to provide a normally open reclosing circuit for the circuit breaker which is completed instantaneously by the closing of the circuit breaker auxiliary contact members when the circuit breaker opens, means responsive to a reclosure of the circuit breaker for operating the control means to open the reclosing circuit and start the sequence timing means for timing subsequent reclosures, and means operable in response to a predetermined operation of the sequence timing means for effecting a return of the control means to the normal position.

3. A reclosing system for a circuit breaker having a closing relay comprising, timing means operable to provide a cycle of a predetermined number of timed reclosures of the circuit breaker, control means cooperative with the timing means to preset a reclosing circuit for energizing the closing relay of the circuit breaker before the circuit breaker opens so that the circuit is completed directly by the circuit breaker immediately upon opening, means responsive to energization of the reclosing circuit for effecting operation of the control means for effecting interruption of the reclosing circuit and operation of the timing means, and means responsive to operation of the timing means for resetting the control means after each reclosing operation of the circuit breaker.

4. A circuit breaker reclosing system comprising, a closing relay operable to effect closing of the circuit breaker, a timing device for effecting reclosure of the circuit breaker in predetermined timed intervals and having normally closed contact means, relay means having normally closed contact means cooperative with the timing device normally closed contact means to provide a normally open instantaneous reclosing circuit for the circuit breaker closing relay, auxiliary contact means actuated by the circuit breaker connected in circuit with the timing device and relay means contact means for completing the reclosing circuit as soon as the circuit breaker opens, means responsive to energization of the reclosing circuit for effecting operation of the relay means to prevent repeated reclosures of the circuit breaker in any one of the timed intervals, and means responsive to a predetermined operation of the timing device for resetting the relay means subsequent to each closure of the circuit breaker.

5. A reclosing system for a circuit breaker having an operating winding comprising, a circuit breaker control relay operable to connect the circuit breaker operating winding to a source of electrical energy, a motor operated timing switch having contact means operated by a plurality of adjustable cam means for providing a closed portion of an operating circuit for the control relay during predetermined adjustable timed intervals of a reclosing sequence including the zero position, relay means having a pair of opposed operating positions to which it may be operated and in either of which it remains until operated to the other, said relay means being normally in one position to provide another closed portion of the operating circuit for the control circuit, means responsive to operation of the circuit breaker to complete the control circuit for the circuit breaker control relay prior to opening of the circuit breaker, means operating the relay means to the other of the operating positions upon operation of the circuit breaker control relay, circuit means controlled by the timing switch for returning the relay means to the initial position, and additional switch means operated by the timing switch operable before the aforesaid switch means to provide an energizing circuit for the timing switch until the end of the sequence.

6. A reclosing system for a circuit breaker having auxiliary contact members which close in response to opening of the circuit breaker comprising, circuit breaker control means operable to effect operation of the circuit breaker, sequence timing means operable to provide a predetermined number of spaced timing intervals in which energization of the circuit breaker control means may be made including contact members normally closed when the circuit breaker is closed, an anti-pumping relay having an armature with contact members selectively operable to and mechanically retainable in either of two operating positions in response to predetermined operations of the timing means and the circuit breaker control means so as to provide normally closed contact members when the circuit breaker is closed, and circuit means including said contact members connected to control energization of the circuit breaker control means and prevent more than one energization of the circuit breaker control means in any one time interval and to provide for operation of the timing means at least immediately subsequent to the operation of the relay to prevent subsequent energizations of the circuit breaker control means.

7. A circuit breaker reclosing system comprising, a circuit breaker closing relay operable to close the circuit breaker, a timing device normally in a non-operating position and having contact members providing an operating cycle of a predetermined number of spaced intervals during which the circuit breaker closing relay may be energized including contact members normally closed in the non-operating position, an anti-pump relay having closed contact members connected in circuit with the normally closed contact members of the timing device for providing an incomplete operating circuit for the circuit breaker closing relay which is completed by auxiliary contact members of the circuit breaker as soon as the circuit breaker opens, means responsive to operation of the circuit breaker control means to effect operation of the anti-pumping relay to interrupt the operating circuit and complete an operating circuit for the timing device, means responsive to predetermined operation of the timing device for effecting operation of the anti-pumping relay to set up the incomplete operating circuit for completion in cooperation with the timing device and the auxiliary contacts of the circuit breaker, and contact means operated by the timing device for maintaining the operation thereof through the remainder of the cycle.

8. An automatic reclosing system for a circuit breaker having auxiliary contact members closable when the circuit breaker opens and a circuit breaker control relay for effecting closure of the circuit breaker comprising, timing means having contact means connected to provide an energizing circuit for the control relay and operable by a predetermined number of adjustable cam means for providing a predetermined number of spaced intervals during which the energizing circuit for the circuit breaker control means may be operated including the normally deenergized position, relay means having normally closed contact members cooperative with the contact means of the timing means and the auxiliary contact members of the circuit breaker to complete the energizing circuit for the circuit breaker control relay immediately the circuit breaker opens, means responsive to operation of the circuit breaker control means for effecting operation of the relay means to open the normally closed contact members and to provide an operating circuit for the timing means, means operated by the timing means for effecting operation of the relay means to close its normally closed contact members, and means operated by the timing means for providing an operating circuit for the timing means through the remainder of the predetermined number of intervals so as to return it to the initial operating condition.

9. An automatic reclosing system for a circuit breaker having a control relay operable to effect closure thereof and auxiliary contact members closed in response to opening of the circuit breaker comprising, a motor operated timing switch having a plurality of adjustable cam means for operating contact means to provide a predetermined number of operations of the control means at different spaced intervals after the circuit breaker opens due to a fault condition, relay means having normally closed contact members connected in circuit with the contact means of the timing switch and the auxiliary contact members of the circuit breaker for providing a direct operating circuit for the control relay, means responsive to operation of the control means for operating the relay means to open its normally closed contact members and complete an operating circuit for the timing switch motor, contact means operated by the timing motor for returning the relay means to the normal position, and additional means including contact means operated by the timing motor for providing an initial operating circuit for the timing motor until the relay means operates to provide an operating circuit.

10. A reclosing system for a circuit breaker having a control relay with auxiliary contacts for effecting closure thereof and auxiliary contact means on the breaker closable when the circuit breaker opens comprising, a timing device having adjustable cam members for operating contact means to provide a predetermined number of spaced intervals during which the control relay may be operated subsequent to opening of the breaker in response to a fault condition, an anti-pumping relay having normally closed contact members connected to provide an energizing circuit for the circuit breaker control relay in conjunction with the auxiliary contact means as soon as the circuit breaker opens, and circuit means including auxiliary contacts of the control relay and contact means of the timing device for operating said relay to open the normally closed contact means when the circuit breaker closes and to reset said relay under the control of the timing device to reclose said contact means to the initial position after reclosure of the circuit breaker.

11. A circuit breaker system comprising, manual switch means for effecting closure of the circuit breaker, automatic reclosing means normally operable to effect reclosing of the circuit breaker when it is open and the manual switch means has been operated to close the circuit breaker, synchronizing switch means preventing manual closure of the circuit breaker upon operation of the manual switch to close the circuit breaker unless the circuits to be connected are synchronized, and means including contact means responsive to operation of the manual switch means to manually trip the circuit breaker effective to render the reclosing means ineffective until the manual switch means is operated to close the circuit breaker through a circuit including the synchronizing switch means.

12. An automatic reclosing system for a circuit breaker comprising, automatic reclosing means providing a reclosing circuit during a sequence of timed reclosing periods for reclosing a circuit breaker subsequent to opening thereof in response to a fault condition, relay means operable to interrupt the reclosing circuit to prevent more than one reclosure of the circuit breaker in each interval, circuit means providing an operating circuit for resetting the reclosing means when the circuit breaker is opened, manual control means for effecting closing or tripping of the circuit breaker, circuit means controlled by the manual control means for rendering the reclosing means effective, synchronous switch means preventing closing of the circuit breaker except when the circuits to be connected are synchronized, and means responsive to operation of the manual control means to trip the circuit breaker for providing an operating circuit for operating the reclosing means to a lockout position so as to prevent operation thereof in response to operation of the manual control means to close the circuit breaker.

13. A control system for a circuit breaker connecting a pair of circuits comprising, reclosing means having timing means for effecting timed reclosures of the circuit breaker subsequent to opening in response to a fault condition, a manual control switch for opening and closing the circuit breaker, said control switch having auxiliary contact members closable when the switch is operated to close the circuit breaker to normally provide a reclosing circuit for the circuit breaker in conjunction with the timing means, synchronizing switch means connected in series relation with the manual control switch for preventing manual closure of the circuit breaker in response to operation of the manual control switch to close the circuit breaker unless the circuits to be connected are synchronized, a control relay operable to effect operation of the timing means, circuit means normally operating the timing means to a reset position ready for reclosing the circuit breaker when it becomes open and the auxiliary contact members of the manual control switch are operated to provide a reclosing circuit for the circuit breaker, and means responsive to operation of the manual control switch for effecting operation of the control relay to effect operation of the timing means to a lockout position whenever the manual control switch is operated to trip the circuit breaker, whereby operation of the timing means to automatically reclose the breaker upon closure of the manual control switch while the synchronizing switch is open is prevented.

MYRON J. BROWN.

REFERENCES CITED

The following references are of record in the file of this patent:

UNITED STATES PATENTS

| Number    | Name         | Date           |
|-----------|--------------|----------------|
| 1,974,978 | Anderson     | Sept. 25, 1934 |
| 2,123,034 | Anderson     | July 5, 1938   |
| 2,282,246 | Reagan       | May 5, 1942    |
| 2,303,440 | Derr         | Dec. 1, 1942   |
| 2,329,081 | Reagan et al.| Sept. 7, 1943  |